United States Patent
Kemmerer et al.

(10) Patent No.: US 11,991,954 B2
(45) Date of Patent: May 28, 2024

(54) LOCKING MECHANISM FOR AN ARM OF AN AGRICULTURAL HEADER

(71) Applicant: CNH Industrial America LLC, New Holland, PA (US)

(72) Inventors: Benjamin David Kemmerer, Hamburg, PA (US); Joel Timothy Cook, Akron, PA (US); Jeffrey D. Thomas, Gordonville, PA (US)

(73) Assignee: CNH Industrial America LLC, New Holland, PA (US)

( * ) Notice: Subject to any disclaimer, the term of this patent is extended or adjusted under 35 U.S.C. 154(b) by 368 days.

(21) Appl. No.: 17/293,267

(22) PCT Filed: Oct. 24, 2019

(86) PCT No.: PCT/US2019/057889
§ 371 (c)(1),
(2) Date: May 12, 2021

(87) PCT Pub. No.: WO2020/101859
PCT Pub. Date: May 22, 2020

(65) Prior Publication Data
US 2022/0000019 A1    Jan. 6, 2022

Related U.S. Application Data

(60) Provisional application No. 62/768,162, filed on Nov. 16, 2018.

(51) Int. Cl.
*A01D 34/28*    (2006.01)
*A01D 34/04*    (2006.01)
*A01D 41/14*    (2006.01)

(52) U.S. Cl.
CPC .......... *A01D 34/283* (2013.01); *A01D 34/04* (2013.01); *A01D 41/145* (2013.01)

(58) Field of Classification Search
CPC .... A01D 34/283; A01D 34/04; A01D 41/145; A01D 34/28; A01D 41/14
See application file for complete search history.

(56) References Cited

U.S. PATENT DOCUMENTS 2,513,703 A * 7/1950 Annis .................... A01D 34/04
                                                    56/10.4
3,535,859 A * 10/1970 Adams .................. A01D 41/14
                                                    56/10.4
(Continued)

FOREIGN PATENT DOCUMENTS

EP    3498071 A1    6/2019
GB    617548 A      2/1949
(Continued)

OTHER PUBLICATIONS

International Search Report for PCT application PCT/US2019/057889, dated Mar. 2, 2020 (14 pages).

*Primary Examiner* — Thomas B Will
*Assistant Examiner* — Julia C Tran
(74) *Attorney, Agent, or Firm* — Peter K. Zacharias; Rebecca L. Henkel; Rickard K. DeMille

(57) ABSTRACT

A locking mechanism includes a pin configured to movably couple to a first element of an agricultural header, wherein the first element includes one of an arm and a frame. The locking mechanism also includes a mount configured to couple to a second element of the agricultural header, wherein the second element includes the other of the arm and the frame. The pin is disposed within an opening of the mount, the opening has a first portion configured to receive the pin while the pin is in a first position and to block relative movement between the pin and the mount to block rotation of the arm, and the opening has a second portion configured to receive the pin while the pin is in a second position and
(Continued)

to enable relative movement between the pin and the mount to enable rotation of the arm.

20 Claims, 9 Drawing Sheets

(56) References Cited

U.S. PATENT DOCUMENTS

| | | | | |
|---|---|---|---|---|
| 4,124,970 | A | * | 11/1978 | Bernhardt .............. A01D 57/04 56/DIG. 15 |
| 4,206,582 | A | * | 6/1980 | Molzahn ................ A01D 57/00 56/15.8 |
| 4,227,363 | A | * | 10/1980 | Kerber ................ A01D 41/145 56/DIG. 15 |
| 4,599,852 | A | | 7/1986 | Kerber et al. |
| 9,452,512 | B2 | | 9/2016 | Joyce |
| 9,538,703 | B2 | | 1/2017 | Cook et al. |
| 2007/0204585 | A1 | * | 9/2007 | Lovett ................. A01D 61/002 56/15.8 |
| 2008/0271426 | A1 | | 11/2008 | Lohrentz et al. |
| 2009/0293441 | A1 | * | 12/2009 | Sauerwein ............. A01D 57/20 56/208 |
| 2010/0000191 | A1 | * | 1/2010 | Ehrhart ................ A01D 34/283 56/10.2 E |
| 2010/0083629 | A1 | | 4/2010 | Klotzbach et al. |
| 2014/0076153 | A1 | * | 3/2014 | Brockmann ........... A01B 63/10 91/34 |
| 2014/0157746 | A1 | * | 6/2014 | Dilts .................... A01D 41/145 254/93 VA |
| 2015/0319920 | A1 | | 11/2015 | Joyce |

FOREIGN PATENT DOCUMENTS

| | | |
|---|---|---|
| GB | 1178221 A | 1/1970 |
| WO | 2017120343 A1 | 7/2017 |

* cited by examiner

LOCKING MECHANISM FOR AN ARM OF AN AGRICULTURAL HEADER

BACKGROUND

The present disclosure relates generally to a locking mechanism for an arm of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing a plant from a field, such as by using a header. The header may cut the agricultural crops and transport the cut crops to a processing system of the combine.

Certain headers include a cutter bar assembly configured to cut a portion of each crop (e.g., a stalk), thereby separating the cut crop from the soil. The cutter bar assembly may extend along a substantial portion of the width of the header at a forward end of the header. In addition, the cutter bar assembly may include a cutter bar, a stationary blade assembly, and a moving blade assembly. The moving blade assembly may be fixed to the cutter bar, and the cutter bar/moving blade assembly may be driven to oscillate relative to the stationary blade assembly. Each blade assembly may include multiple blades distributed along the width of the respective blade assembly. As the moving blade assembly is driven to oscillate, the blades of the moving blade assembly move relative to the blades of the stationary blade assembly. As the header is moved through the field by the harvester, a portion of a crop (e.g., the stalk) may enter a gap between adjacent blades of the stationary blade assembly and a gap between adjacent blades of the moving blade assembly. Movement of the moving blade assembly causes a blade of the moving blade assembly to move across the gap in the stationary blade assembly, thereby cutting the portion of the crop.

Certain cutter bar assemblies are flexible along the width of the header. Such a cutter bar assembly may be supported by multiple longitudinally extending arms distributed along the width of the header. Each arm may be pivotally mounted to a frame of the header, thereby enabling the cutter bar assembly to flex during operation of the harvester. The flexible cutter bar assembly may follow the contours of the field, thereby enabling the cutting height to be substantially constant along the width of the header. However, if a substantially rigid cutter bar is desired (e.g., for certain field conditions, for harvesting certain types of crops, etc.), the pivoting movement of each arm may be blocked, thereby substantially reducing the flexibility of the cutter bar assembly. For example, a pin may be inserted through an opening in an arm and through a corresponding opening in the header frame, thereby blocking pivoting movement of the arm. Unfortunately, the process of aligning the opening of each arm with the corresponding opening in the header frame to facilitate insertion of the pin may be difficult and time consuming. For example, an operator may manually move each arm to a position that aligns the arm opening with the corresponding header frame opening. However, due to the weight of each arm and the weight supported by the arm, manual movement of the arm may be difficult, especially with regard to moving the arm to the exact position that establishes opening alignment. Due to the difficulty in positioning each arm of the header, the harvesting process may be significantly delayed if a transition between a flexible cutter bar assembly and a rigid cutter bar assembly is desired, thereby reducing the efficiency of the harvesting process.

BRIEF DESCRIPTION

In certain embodiments, a locking mechanism includes a pin configured to be movably coupled to a first element of an agricultural header, such that the pin is movable between a first pin position and a second pin position relative to the first element. The first element includes one of an arm and a frame of the agricultural header. In addition, the locking mechanism includes a biasing assembly configured to selectively urge the pin toward the first pin position and toward the second pin position. The locking mechanism also includes a mount configured to couple to a second element of the agricultural header, in which the second element includes the other of the arm and the frame. Furthermore, the arm is configured to support a cutter bar assembly of the agricultural header, and the arm is configured to rotate about a pivot axis relative to the frame. In addition, the mount has an opening, the pin is disposed within the opening, and the opening has a first portion and a second portion. The first portion is configured to receive the pin while the pin is in the first pin position, the second portion is configured to receive the pin while the pin is in the second pin position, the first portion is configured to block relative movement between the pin and the mount about the pivot axis to block rotation of the arm, and the second portion is configured to enable relative movement between the pin and the mount about the pivot axis to enable rotation of the arm.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
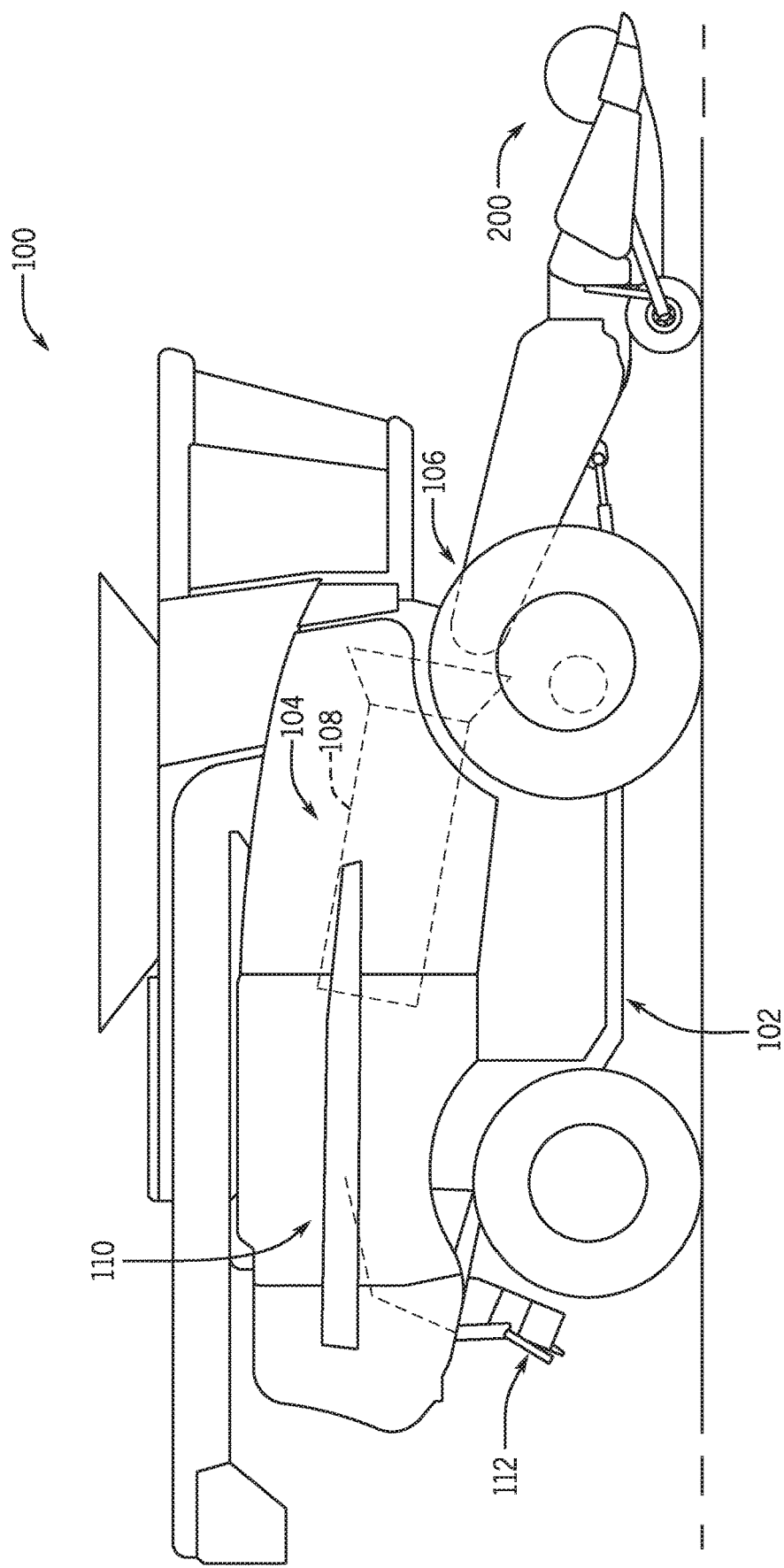
FIG. 1 is a side view of an embodiment of an agricultural harvester having a header.

Turning to the drawings, FIG. 1 is a side view of an embodiment of an agricultural harvester 100 having a header 200. The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. The cutter bar assembly is configured to flex along a width of the header to enable the cutter bar assembly to substantially follow the contours of the field. The cutter bar assembly is supported by multiple longitudinally extending arms distributed along the width of the header. Each arm is pivotally mounted to a frame of the header, thereby enabling the cutter bar assembly to flex. If a substantially rigid cutter bar is desired (e.g., for certain field conditions, for harvesting certain types of crops, etc.), the pivoting movement of each arm may be blocked, thereby substantially reducing the flexibility of the cutter bar assembly.

In certain embodiments, the header includes multiple locking mechanisms, each configured to transition between a locked state and an unlocked state. While in the locked state, each locking mechanism is configured to block rotation of a respective arm, and while in the unlocked state, each locking mechanism is configured to facilitate rotation of the respective arm relative to the frame of the agricultural header. To establish a substantially rigid cutter bar assembly, each locking mechanism may be transitioned to a locking state (e.g., by moving a respective handle relative to the arm). The agricultural header frame may then be raised or lowered relative to the soil surface. As each arm reaches a locking orientation, each respective locking mechanism may automatically transition from the locking state to the locked state, thereby blocking rotation of the respective arm relative to the header frame. In addition, to establish a flexible cutter bar assembly, each locking mechanism may be transitioned to an unlocking state (e.g., by moving a respective handle relative to the arm). The agricultural header frame may then be raised or lowered relative to the soil surface. As each arm reaches an unlocking orientation, each respective locking mechanism may automatically transition from the unlocking state to the unlocked state, thereby facilitating rotation of the respective arm relative to the header frame. Because each locking mechanism is configured to automatically transition to the locked/unlocked state in response to the arm rotating to the locking/unlocking orientation, the process of manually rotating each arm to a position that facilitates engagement/removal of a pin with/from openings in the arm and the header frame to block/enable rotation of the arm is obviated. As a result, the cutter bar assembly may be transitioned between the flexible configuration and the substantially rigid configuration more rapidly (e.g., as compared to a process involving inserting/removing a pin through/from an opening in the arm and a corresponding opening in the frame of the agricultural header to block/enable rotation of the arm). As a result, the efficiency of the harvesting process may be enhanced.

Figure 2:
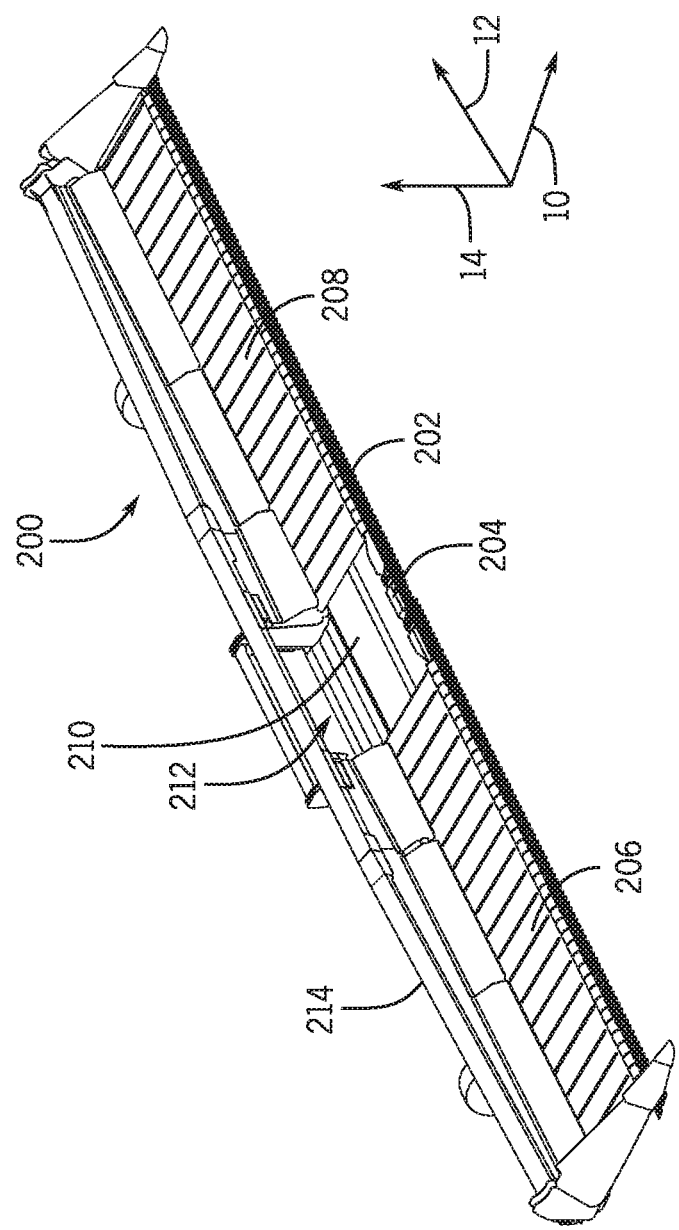
FIG. 2 is a perspective view of an embodiment of a header that may be employed within the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). As discussed in detail below, the cutter bar assembly includes a cutter bar, a stationary blade assembly, and a moving blade assembly. The moving blade assembly is fixed to the cutter bar (e.g., above the cutter bar relative to a vertical axis 14 of the header 200), and the cutter bar/moving blade assembly is driven to oscillate relative to the stationary blade assembly. In the illustrated embodiment, the cutter bar/moving blade assembly is driven to oscillate by a driving mechanism 204 positioned at the lateral center of the header 200. However, in other embodiments, the cutter bar/moving blade assembly may be driven by another suitable mechanism (e.g., located at any suitable position on the header). As the harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10. In certain embodiments, the crops cut by the cutter bar assembly 202 are directed toward the belts by a reel assembly. Agricultural crops that contact the top surface of the lateral belts are driven laterally inwardly to the longitudinal belt due to the movement of the lateral belts. In addition, agricultural crops that contact the longitudinal belt 210 and the agricultural crops provided to the longitudinal belt by the lateral belts are driven rearwardly along the longitudinal axis 10 due to the movement of the longitudinal belt 210. Accordingly, the belts move the cut agricultural crops through an opening 212 in the header 200 to the inlet of the agricultural crop processing system.

In the illustrated embodiment, the cutter bar assembly 202 is flexible along the width of the header 200 (e.g., the extent of the header 200 along the lateral axis 12). As discussed in detail below, the cutter bar assembly 202 is supported by multiple arms extending along the longitudinal axis 10 and distributed along the width of the header 200 (e.g., along the lateral axis 12 of the header 200). Each arm is mounted to a frame 214 of the header 200 and configured to rotate about a pivot axis relative to the frame. As a result, the cutter bar assembly 202 may flex during operation of the harvester. The flexible cutter bar assembly may follow the contours of the field, thereby enabling the cutting height (e.g., the height at which each crop is cut) to be substantially constant along the width of the header 200 (e.g., the extent of the header 200 along the lateral axis 12). However, if a substantially rigid cutter bar assembly is desired (e.g., for certain field conditions, for harvesting certain types of crops, etc.), the pivoting movement of the arms may be blocked, thereby substantially reducing the flexibility of the cutter bar assembly.

In certain embodiments, the agricultural header includes multiple locking mechanisms, each configured to transition between a locked state and an unlocked state. While in the locked state, each locking mechanism is configured to block rotation of a respective arm, and while in the unlocked state, each locking mechanism is configured to facilitate rotation of the respective arm relative to the header frame. As discussed in detail below, each locking mechanism includes a pin configured to movably couple to a respective arm of the agricultural header, such that the pin is movable between a first pin position and a second pin position relative to the arm. As previously discussed, the arm is configured to support the cutter bar assembly of the agricultural header, and the arm is configured to rotate about the pivot axis relative to the frame of the agricultural header. The locking mechanism includes a biasing assembly configured to selectively urge the pin toward a first pin position and toward a second pin position. In addition, the locking mechanism includes a mount configured to couple to the frame of the agricultural header. The mount has an opening, and the pin is disposed within the opening. The opening has a first portion and a second portion, the first portion is configured to receive the pin while the pin is in the first pin position, and the second portion is configured to receive the pin while the pin is in the second pin position. Furthermore, the first portion is configured to block movement of the pin about the pivot axis to block rotation of the arm, and the second portion is configured to enable movement of the pin about the pivot axis to enable rotation of the arm.

In certain embodiments, the biasing assembly includes a handle and at least one biasing member. The handle is movable between a first handle position and a second handle position. In addition, the handle is configured to drive the at least one biasing member to urge the pin toward the first pin position while the handle is in the first handle position, and the handle is configured to drive the at least one biasing member to urge the pin toward the second pin position while the handle is in the second handle position. To transition the cutter bar assembly from the flexible configuration to the substantially rigid configuration, the handle of each locking mechanism may be moved to the first handle position, thereby transitioning the locking mechanism to a locking state. With the handle in the first handle position, the at least one biasing member urges the pin toward the first pin position. In response to the arm reaching a locking orientation (e.g., which may result from the agricultural header being moved upwardly or downwardly), the pin is driven to the first pin position by the at least one biasing member, thereby placing the pin in the first portion of the opening in the mount. With the pin in the first portion of the opening, movement of the pin about the pivot axis is blocked, thereby blocking rotation of the arm. Accordingly, the locking mechanism transitions from the locking state to the locked state in response to the arm reaching the locking orientation. Because each locking mechanism is configured to automatically transition to the locked state in response to the arm rotating to the locking orientation, the process of manually rotating each arm to a position that facilitates engagement of a pin with openings in the arm and the header frame to block rotation of the arm is obviated. As a result, the cutter bar assembly may be transitioned between the flexible configuration and the substantially rigid configuration more rapidly (e.g., as compared to a process involving inserting a pin through an opening in the arm and a corresponding opening in the frame of the agricultural header to block rotation of the arm). As a result, the efficiency of the harvesting process may be enhanced.

Furthermore, to transition the cutter bar assembly from the substantially rigid configuration to the flexible configuration, the handle of each locking mechanism may be moved to the second handle position, thereby transitioning the locking mechanism to the unlocking state. With the handle in the second handle position, the at least one biasing member urges the pin toward the second pin position. In response to the arm reaching the unlocking orientation (e.g., which may result from the agricultural header being moved upwardly or downwardly), the pin is driven to the second pin position by the at least one biasing member, thereby placing the pin in the second portion of the opening in the mount. With the pin in the second portion of the opening, movement of the pin about the pivot axis is enable, thereby enabling rotation of the arm relative to the header frame. Accordingly, the locking mechanism transitions from the unlocking state to the unlocked state in response to the arm reaching the unlocking orientation. Because each locking mechanism is configured to automatically transition to the unlocked state in response to the arm rotating to the unlocking orientation, the process of manually rotating each arm to a position that facilitates removal of a pin from openings in the arm and the header frame to enable rotation of the arm is obviated. As a result, the cutter bar assembly may be transitioned between the substantially rigid configuration and the flexible configuration more rapidly (e.g., as compared to a process involving removing a pin from an opening in the arm and a corresponding opening in the frame of the agricultural header to facilitate rotation of the arm). As a result, the efficiency of the harvesting process may be enhanced.

Figure 3:
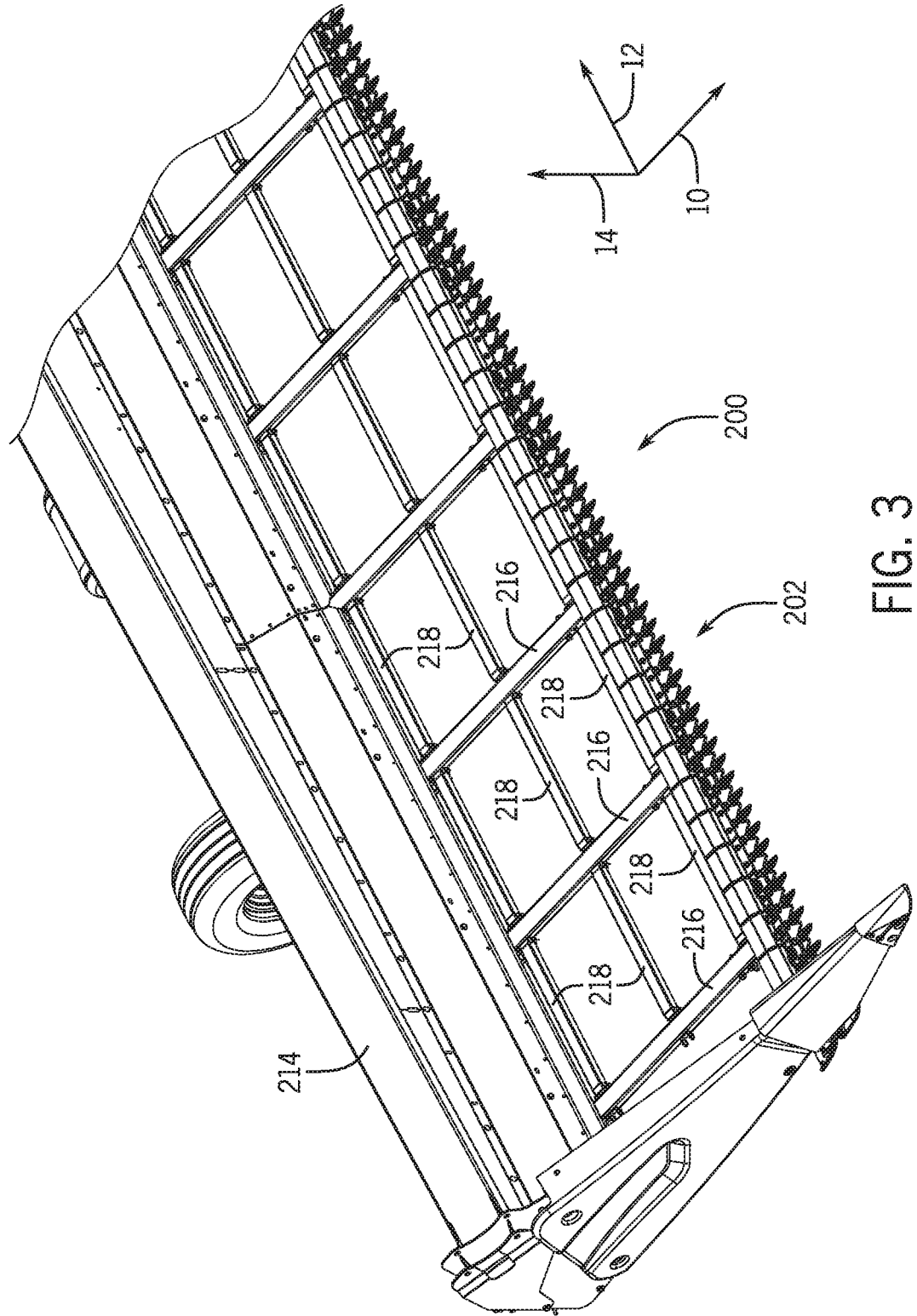
FIG. 3 is a perspective view of a portion of the header of FIG. 2, including a cutter bar assembly and arms that support the cutter bar assembly.

FIG. 3 is a perspective view of a portion of the header 200 of FIG. 2, including the cutter bar assembly 202 and arms 216 that support the cutter bar assembly 202. As illustrated, each arm 216 extends substantially along the longitudinal axis 10. However, in alternative embodiments, each arm may extend in any suitable direction. In the illustrated embodiment, the arms 216 are distributed along the width of the header 200 (e.g., the extent of the header along the lateral axis 12). The spacing between the arms may be selected to enable the arms to support the cutter bar assembly and to enable the cutter bar assembly to flex during operation of the header (e.g., while the cutter bar assembly is in the flexible configuration). As discussed in detail below, each arm 216 is pivotally coupled to the frame 214 via a respective pivot joint, and the pivot joint is configured to enable the respective arm 216 to rotate relative to the frame 214 about a respective pivot axis. In the illustrated embodiment, lateral supports 218 extend between respective pairs of arms 216. A first end of each lateral support 218 is pivotally coupled to one arm 216, and a second end of each lateral support 218 is pivotally coupled to another arm 216. The lateral supports 218 are configured to support the respective lateral belt, while enabling the arms to rotate about the respective pivot axes relative to the frame 214. While three lateral supports are positioned between each pair of arms in the illustrated embodiment, in other embodiments, more or fewer lateral supports may be positioned between at least one pair of arms (e.g., 1, 2, 3, 4, 5, 6, etc.). Furthermore, in certain embodiments, the lateral supports may be omitted between at least one pair of arms.

Figure 4:
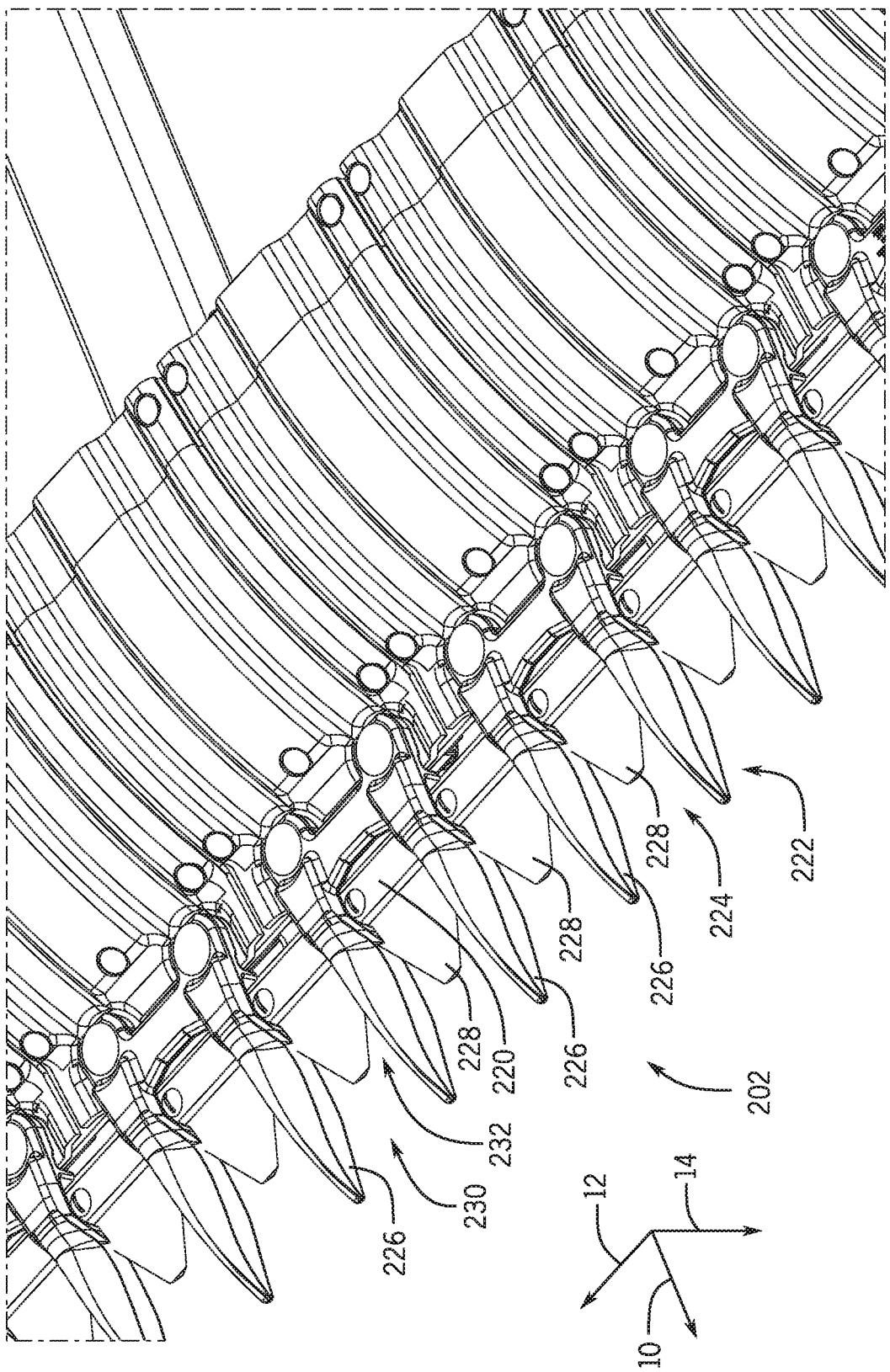
FIG. 4 is a perspective view of the cutter bar assembly of FIG. 3.

FIG. 4 is a perspective view of the cutter bar assembly 202 of FIG. 3. As illustrated, the cutter bar assembly 202 includes a cutter bar 220, a stationary blade assembly 222, and a moving blade assembly 224. The moving blade assembly 224 is coupled to the cutter bar 220, and the cutter bar 220/moving blade assembly 224 are driven to oscillate relative to the stationary blade assembly 222. The stationary blade assembly 222 includes multiple stationary blades 226 distributed along the width of the stationary blade assembly 222 (e.g., the extent of the stationary blade assembly 222 along the lateral axis 12), and the moving blade assembly 224 includes multiple moving blades 228 distributed along the width of the moving blade assembly 224 (e.g., the extent of the moving blade assembly 224 along the lateral axis 12). As the moving blade assembly 224 is driven to oscillate, the moving blades 228 move relative to the stationary blades 226. As the header is moved through the field by the harvester, a portion of a crop (e.g., the stalk) may enter a gap 230 between adjacent stationary blades 226 and a gap 232 between adjacent moving blades 228. Movement of the moving blade assembly 224 causes a moving blade 228 to move across the gap 230 in the stationary blade assembly 222, thereby cutting the portion of the crop.

In the illustrated embodiment, the stationary blade assembly 222 is coupled to the arms of the header via laterally extending support bars. For example, in certain embodiments, the support bars are coupled to the arms via fasteners, and the stationary blades of the stationary blade assembly are coupled to respective support bars by fasteners. In addition, the cutter bar 220 and the movable blade assembly 224 are movably coupled to the stationary blade assembly 222 (e.g., the cutter bar and the moving blade assembly pass through openings in the stationary blades). The support bars and the cutter bar 220 are flexible, thereby enabling the cutter bar assembly 202 to flex in response to variations in the soil surface (e.g., while the cutter bar assembly 202 is in contact with the soil surface). While the cutter bar assembly 202 is coupled to arms via support bars and fasteners in the illustrated embodiment, in other embodiments, the cutter bar assembly may be coupled to the arms via another suitable connection system (e.g., the stationary blade assembly may be welded to the arms, etc.). In addition, the cutter bar/moving blade assembly may be movably coupled to the stationary blade assembly by any suitable connection system.

Figure 5:
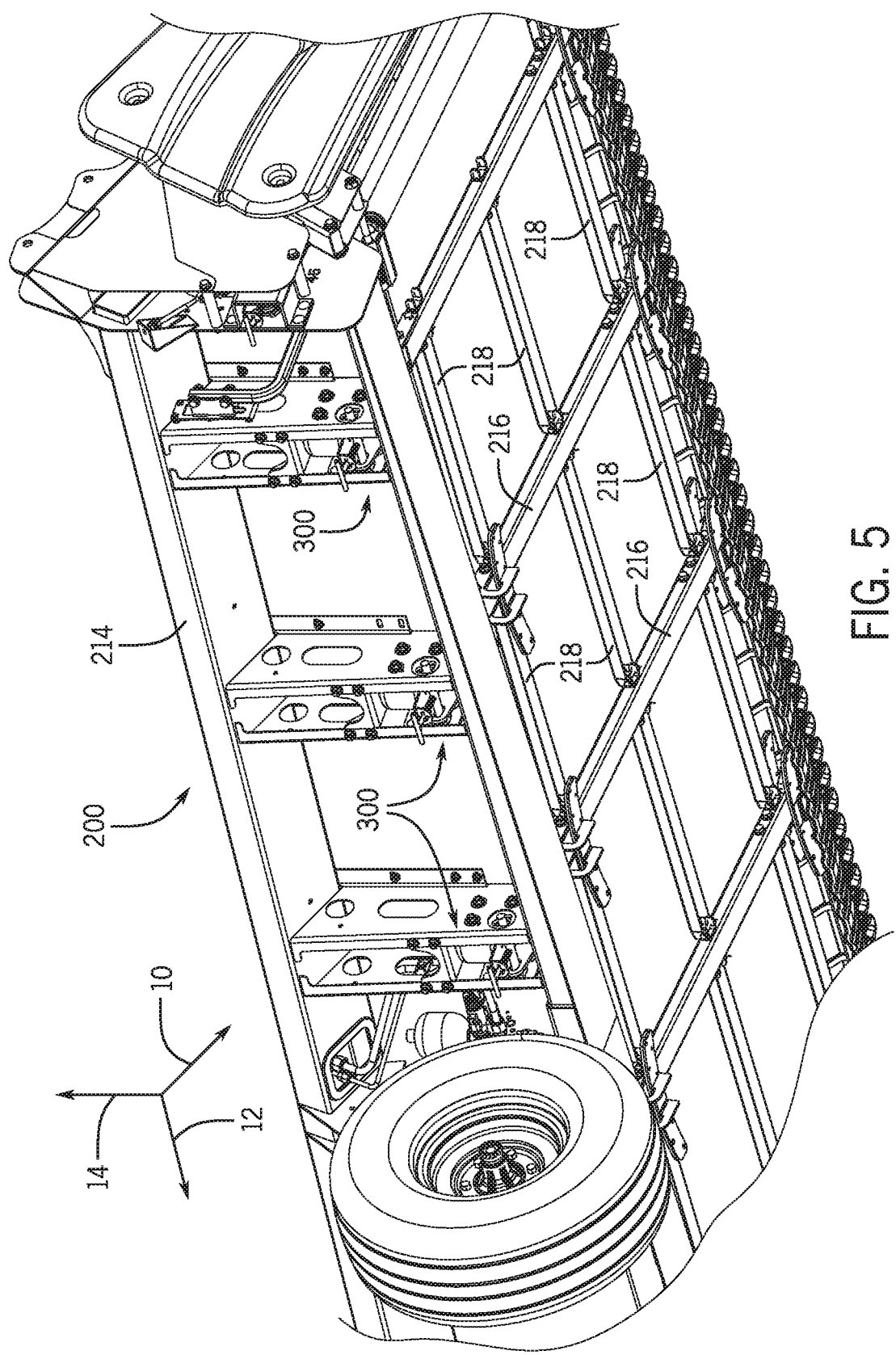
FIG. 5 is a rear perspective view of a portion of the header of FIG. 2, including locking mechanisms configured to selectively block rotation of the arms.

FIG. 5 is a rear perspective view of a portion of the header 200 of FIG. 2, including locking mechanisms 300 configured to selectively block rotation of the arms 216. In the illustrated embodiment, each locking mechanism 300 is configured to selectively block rotation of a respective arm 216. However, in other embodiments, at least one locking mechanism may be configured to selectively block rotation of multiple arms. Furthermore, in the illustrated embodiment, the locking mechanisms 300 are positioned on a rear portion of the frame 214 and accessible by an operator positioned rearward of the frame 214. However, in alternative embodiments, at least one locking mechanism may be positioned in another suitable position (e.g., on a forward portion of the frame, on a top portion of the frame, on a bottom portion of the frame, etc.) and accessible by an operator positioned at a corresponding location relative to the frame.

Figure 6:
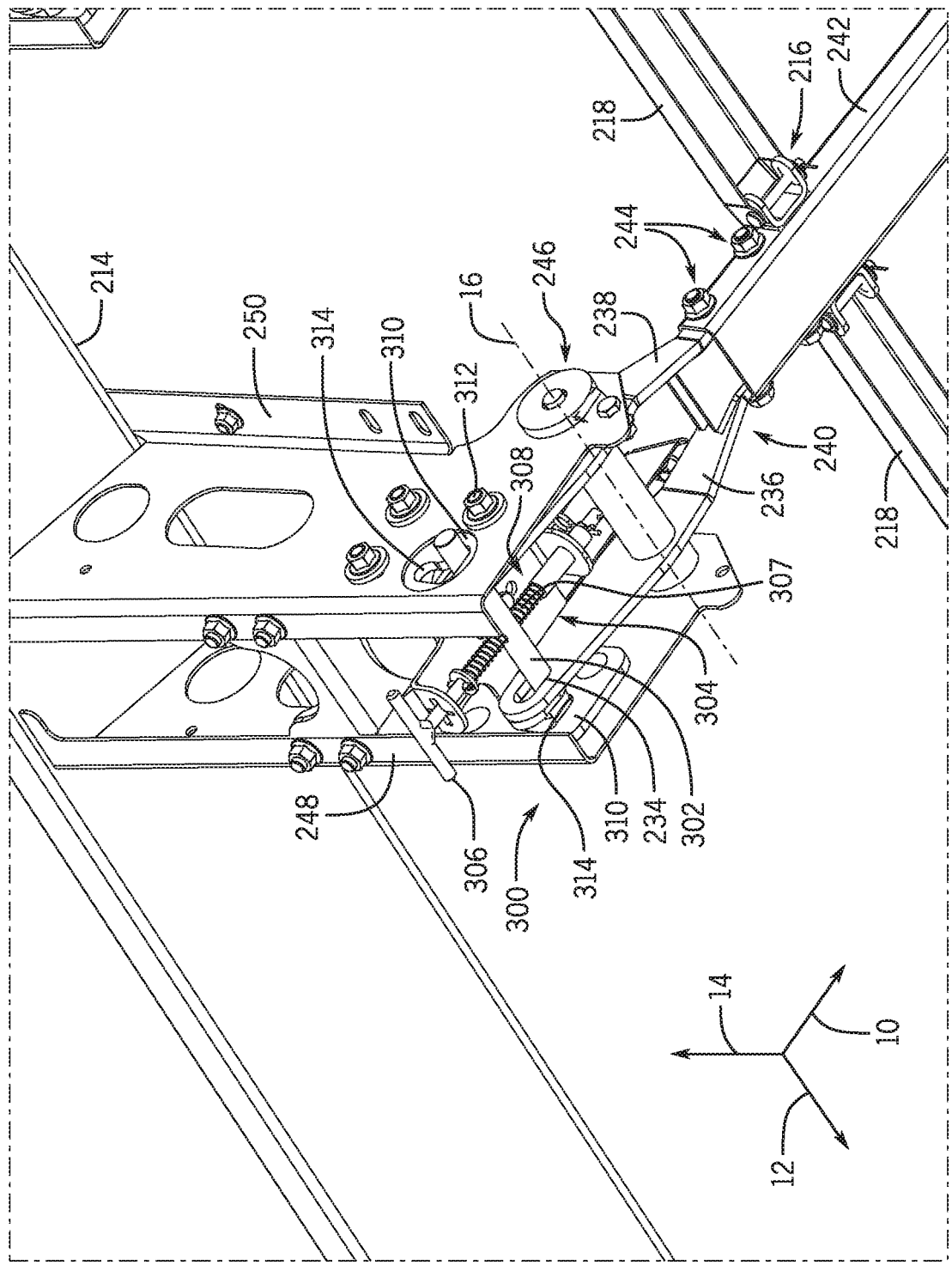
FIG. 6 is a perspective view of an arm and a locking mechanism of the header of FIG. 2.

FIG. 6 is a perspective view of an arm 216 and a locking mechanism 300 of the header of FIG. 2. As illustrated, the locking mechanism 300 includes a pin 302 movably coupled to the arm 216 (e.g., first element), such that the pin 302 is movable between a first pin position, as illustrated, and a second pin position relative to the arm 216. In the illustrated embodiment, the pin 302 is movably coupled to the arm 216 via slots 234 extending through the arm 216. The slots 234 are formed within a first member 236 and a second member 238 of a forked portion 240 of the arm 216. In the illustrated embodiment, the forked portion 240 of the arm 216 is coupled to a bar 242 of the arm 216 via fasteners 244, such as the illustrated bolts/nuts. However, in alternative embodiments, the forked portion of the arm may be coupled to the bar of the arm via other suitable fastener(s) (e.g., rivet(s), screw(s), etc.), via a welded connection, via an adhesive connection, via another suitable type of connection, or a combination thereof. Furthermore, in certain embodiments, the bar of the arm may be integral with the forked portion of the arm. In addition, while the forked portion 240 of the arm 216 includes two members in the illustrated embodiment, in other embodiments, the forked portion of the arm may include more or fewer members (e.g., 1, 2, 3, 4, 5, 6, etc.). In certain embodiments, the forked portion of the arm may be omitted, and the slot(s) may be formed within the bar of the arm. Furthermore, while the arm 216 includes two slots 234 in the illustrated embodiment, in other embodiments, the arm may have more or fewer slots to movably couple the pin to the arm.

As previously discussed, the arm 216 is configured to support the cutter bar assembly of the agricultural header. For example, a longitudinal end of the bar 242 of the arm 216, opposite the end coupled to the forked portion 240, may be coupled to the cutter bar assembly, such that the arm supports the cutter bar assembly during operation of the agricultural header. As previously discussed, the arm 216 is configured to rotate about a pivot axis 16 relative to the frame 214 of the agricultural header. As illustrated, the arm 216 is pivotally coupled to the frame 214 by a pivot joint 246. In the illustrated embodiment, the pivot joint 246 is formed at a first strut 248 and a second strut 250 of the frame 214 and at the forked portion 240 of the arm 216. However, in alternative embodiments, the pivot joint 246 may be formed at any suitable portion of the frame and/or at any suitable portion of the arm. For example, the pivot joint may be formed at more or fewer struts of the frame. In the illustrated embodiment, the locking mechanism 300 is positioned on an opposite side of the pivot joint 246 from the cutter bar assembly, which may be coupled to the bar 242 of the arm 216. However, in other embodiments, the locking mechanism and the cutter bar assembly may be positioned on the same side of the pivot joint.

In the illustrated embodiment, the locking mechanism 300 includes a biasing assembly 304 configured to selectively urge the pin 302 to the first pin position, as illustrated, (e.g., at a first end of the slots 234) and toward the second pin position (e.g., at a second end of the slots 234, opposite the first end). In the illustrated embodiment, the biasing assembly 304 includes a handle 306 and at least one biasing member 308 (e.g., at least one spring). An extension member 307 of the handle 306 extends through an opening in the pin 302, and the handle 306 is movable relative to the pin 302. The handle 306 is movable between a first handle position, as illustrated, and a second handle position (e.g., along the longitudinal axis 10). The handle 306 is configured to drive the at least one biasing member 308 to urge the pin 302 toward the first pin position while the handle 306 is in the first handle position, and the handle 306 is configured to drive the at least one biasing member 308 to urge the pin 302 toward the second pin position while the handle 306 is in the second handle position. While the biasing assembly 304 includes the handle 306 in the illustrated embodiment, in other embodiments, the biasing assembly may include another suitable device configured to drive the at least one biasing member to selectively urge the pin toward the first pin position and toward the second pin position. For example, the biasing assembly may include an actuator (e.g., solenoid, hydraulic cylinder, pneumatic cylinder, etc.) configured to extend and retract to drive the at least one biasing member. By way of further example, the biasing assembly may include a screw drive (e.g., manually actuated or actuated by an actuator, such as a motor) configured to drive the at least one biasing member.

The locking mechanism 300 also includes mounts, such as the illustrated plates 310, coupled to the frame 214 (e.g., second element) of the agricultural header. In the illustrated embodiment, the locking mechanism includes a first plate 310 coupled to the first strut 248 of the frame 214 and a second plate 310 coupled to the second strut 250 of the frame 214. However, in alternative embodiments, the locking mechanism may include more or fewer plates, each coupled to a suitable portion of the header frame. For example, in certain embodiments, the locking mechanism may include a single plate coupled to one of the struts, or the locking mechanism may include three or more plates, each coupled to a respective strut. Furthermore, in certain embodiments, at least one plate may be coupled to another suitable portion of the frame. In addition, while each mount is plate-shaped in the illustrated embodiment, in other embodiments, at least one mount may have another suitable shape (e.g., a three-dimensional shape configured to match the contours of the frame, a rectangular prismatic shape, etc.). In the illustrated embodiment, each plate 310 is coupled to the frame 214 via fasteners 312, such as the illustrated bolts/nuts. However, in alternative embodiments, at least one plate may be coupled to the frame via other suitable fastener(s) (e.g., rivet(s), screw(s), etc.), via a welded connection, via an adhesive connection, via another suitable type of connection, or a combination thereof. Furthermore, in certain embodiments, the plate may be coupled to the frame via an integral connection. For example, the plate and the portion of the frame surrounding the plate may be formed from a single piece of material.

As illustrated, the pin 302 is disposed within an opening 314 in each plate 310. As discussed in detail below, each opening has a first portion and a second portion. The first portion is configured to receive the pin 302 while the pin 302 is in the first pin position, as illustrated, and the second portion is configured to receive the pin while the pin is in the second pin position. Furthermore, the first portion of the opening 314 is configured to block movement of the pin 302 about the pivot axis 16 to block rotation of the arm 216, and the second portion of the opening 314 is configured to enable movement of the pin 302 about the pivot axis 16 to enable rotation of the arm 216. Accordingly, with the handle 306 in the illustrated first handle position and the pin 302 in the first portion of the opening 314, rotation of the arm 216 about the pivot axis 16 is blocked. As such, the locking mechanism 300 is in the locked state. To transition the cutter bar assembly to a substantially rigid configuration, each locking mechanism of the agricultural header may be transitioned to the locked state, thereby blocking rotation of each respective arm. With rotation of the arms blocked, the arms hold the cutter bar assembly in the substantially rigid configuration.

To transition the cutter bar assembly to the flexible configuration, the handle of each locking mechanism may be moved to the second handle position. As previously discussed, the handle is configured to drive the at least one biasing member to urge the pin toward the second pin position while the handle is in the second handle position. Accordingly, moving the handle of each locking mechanism to the second handle position transitions the locking mechanism to an unlocking state. Once each locking mechanism is in the unlocking state, the header frame may be raised or lowered relative to the soil surface (e.g., by controlling actuator(s) extending between the frame of the header and the chassis of the harvester). As each arm reaches an unlocking orientation (e.g., an orientation that enables the pin to move from the first portion of each opening to the second portion of the opening), each locking mechanism may transition from the unlocking state to the unlocked state, in which the pin is in the second portion of each opening. As previously discussed, with the pin in the second portion of each opening, the respective arm may rotate about the pivot axis. Rotation of the arms relative to the header frame enables the cutter bar assembly to flex.

To transition the cutter bar assembly from the flexible configuration to the substantially rigid configuration, the handle of each locking mechanism may be moved to the first handle position. As previously discussed, the handle is configured to drive the at least one biasing member to urge the pin toward the first pin position while the handle is in the first handle position. Accordingly, moving the handle of each locking mechanism to the first handle position transitions the locking mechanism to a locking state. Once each locking mechanism is in the locking state, the header frame may be raised or lowered relative to the soil surface (e.g., by controlling actuator(s) extending between the frame of the header and the chassis of the harvester). As each arm reaches a locking orientation (e.g., an orientation that enables the pin to move from the second portion of each opening to the first portion of the opening), each locking mechanism may transition from the locking state to the locked state, in which the pin is in the first portion of each opening. As previously discussed, with the pin in the first portion of each opening, rotation of the respective arm about the pivot axis may be blocked. Blocking rotation of each arm relative to the header frame places the cutter bar assembly in the substantially rigid configuration.

Figure 7:
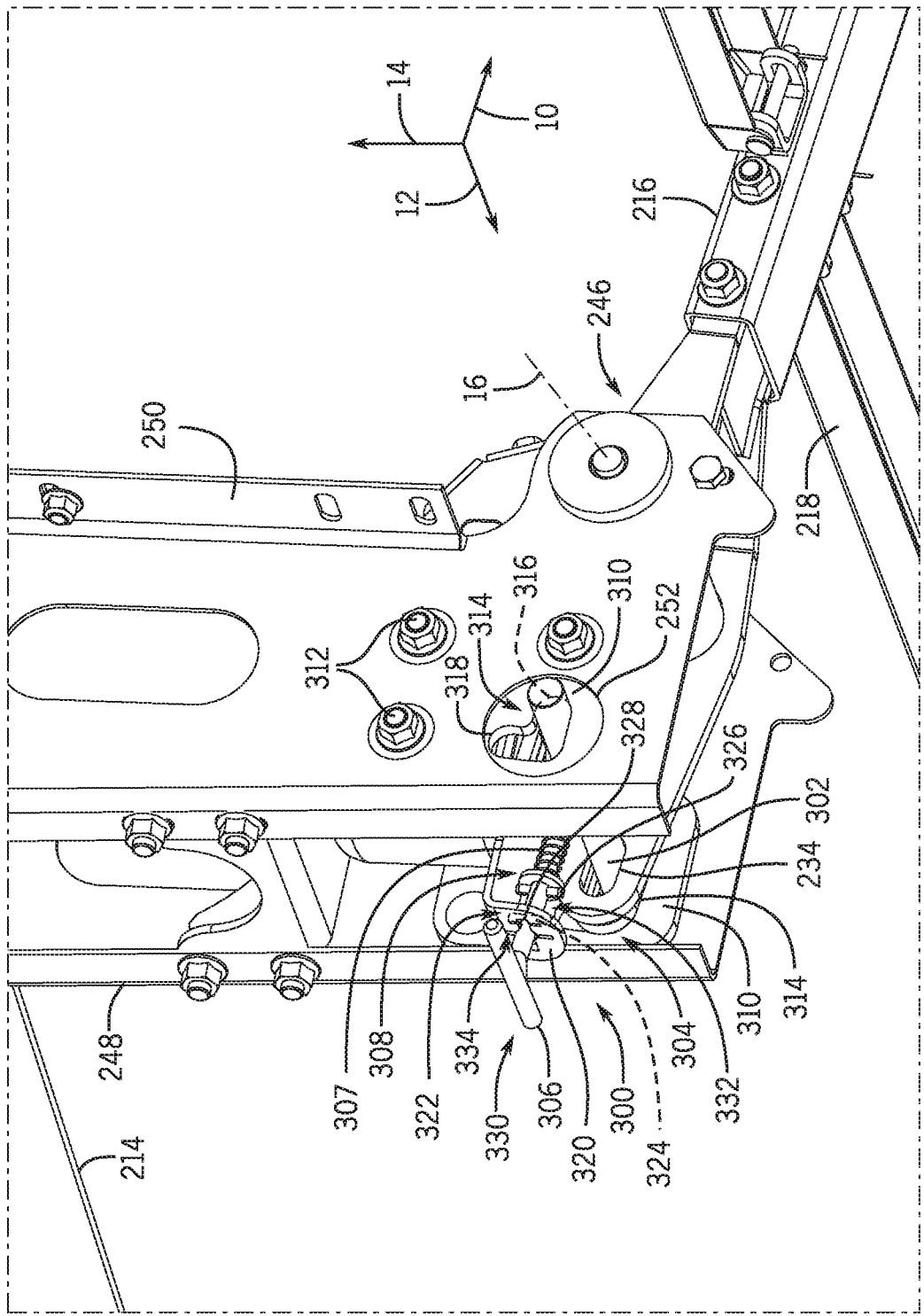
FIG. 7 is a perspective view of the locking mechanism of FIG. 6.

FIG. 7 is a perspective view of the locking mechanism 300 of FIG. 6. As previously discussed, the first plate 310 of the locking mechanism 300 is coupled to the first strut 248 of the frame 214, and the second plate 310 of the locking mechanism 300 is coupled to the second strut 250 of the frame 214. In the illustrated embodiment, an opening 252 is formed in each strut. The strut opening 252 is sized larger than the opening 314 in the respective plate 310, thereby enabling the pin 302 to move within the plate opening 314. While each strut opening 252 is circular in the illustrated embodiment, in other embodiments, at least one strut opening may have another suitable shape, such as polygonal, elliptical, substantially matching the shape of the plate opening, etc.

In the illustrated embodiment, the opening 314 has a first portion 316 and a second portion 318. As illustrated, the first portion 316 extends substantially along the longitudinal axis 10, and the second portion 318 extends substantially along the vertical axis 14. As previously discussed, the first portion 316 is configured to receive the pin 302 while the pin 302 is in the first pin position, as illustrated. In addition, the second portion 318 is configured to receive the pin 302 while the pin 302 is in the second pin position. As illustrated, the first portion 316 of the opening 314 is configured to block movement of the pin about the pivot axis 16, thereby blocking rotation of the arm 216. In addition, the second portion 318 of the opening 314 is configured to enable movement of the pin 302 about the pivot axis 16, thereby enabling rotation of the arm 216. The extent of the second portion 318 about the pivot axis 16 (e.g., the extent of the second portion 318 along the vertical axis 14) may be particularly selected to control the rotational range of motion of the arm 216. For example, in certain embodiments, the second portion may extend above and below the first portion about the pivot axis (e.g., along the vertical axis). Furthermore, while each portion of the plate opening establishes a substantially linear pin path in the illustrated embodiment, in other embodiments, at least one portion of the plate opening may have another suitable shape (e.g., polygonal, curved, etc.). For example, in certain embodiments, the shape of the second portion of the plate opening may substantially correspond to the path of the pin as the arm rotates about the pivot axis.

In the illustrated embodiment, the locking mechanism 300 includes a blocking member 320 configured to selectively hold the handle 306 in the first handle position, as illustrated, and in the second handle position. The blocking member 320 is coupled to the arm 216 and configured to rotate with the arm 216 about the pivot axis 16. As illustrated, the handle 306 (e.g., an extension member 307 of the handle 306) extends through an opening 322 in the blocking member 320. The handle 306 includes a first rod 324 (e.g., first blocking feature) and a second rod 326 (e.g., second blocking feature). In addition, a slot 328 is formed in the blocking member 320. The slot 328 is configured to facilitate passage of the first rod 324 through the blocking member 320 while the first rod 324 is aligned with the slot 328 and to facilitate passage of the second rod 326 through the blocking member 320 while the second rod 326 is aligned with the slot 328. In addition, the first rod 324 is configured to engage the blocking member 320 (e.g., a longitudinal side of the blocking member 320) to block movement of the handle 306 from the first handle position, as illustrated, to the second handle position while the handle 306 is in the first handle position. Furthermore, the second rod 326 is configured to engage the blocking member 320 (e.g., a longitudinal side of the blocking member 320) to block movement of the handle 306 from the second handle position to the first handle position while the handle 306 is in the second handle position.

To transition the locking mechanism 300 from the illustrated locked state to the unlocked state, the handle 306 may be rotated (e.g. about the longitudinal axis 10) such that the first rod 324 and the second rod 326 are aligned with the slot 328. The handle 306 may then be moved from the illustrated first handle position to the second handle position (e.g., via reward translation along the longitudinal axis 10). With the handle 306 in the second handle position, the second rod 326 is positioned on a first side 330 of the blocking member 320. The handle 306 may then be rotated (e.g., about the longitudinal axis 10) such that the second rod 326 is not aligned with the slot 328. Accordingly, movement of the handle 306 from the second handle position toward the first handle position is blocked by contact between the second rod 326 and the blocking member 320. As previously discussed, with the handle 306 in the second handle position, the handle 306 drives the at least one biasing member 308 to urge the pin 302 toward the second pin position. The header frame may be raised or lowered relative to the soil surface (e.g., by controlling actuator(s) extending between the frame of the header and the chassis of the harvester). As the arm 216 reaches the unlocking orientation (e.g., the orientation that enables the pin 302 to move from the first portion 316 of the opening 314 to the second portion 318 of the opening 314), the locking mechanism 300 transitions to the unlocked state, in which the pin 302 is in the second portion 318 of the opening 314.

To transition the locking mechanism 300 from the unlocked state to the locked state, the handle 306 may be rotated (e.g. about the longitudinal axis 10) such that the first rod 324 and the second rod 326 are aligned with the slot 328. The handle 306 may then be moved from the second handle position to the first handle position (e.g., via forward translation along the longitudinal axis 10). With the handle 306 in the first handle position, the first rod 324 is positioned on a second side 332 of the blocking member 320. The handle 306 may then be rotated (e.g., about the longitudinal axis 10) such that the first rod 324 is not aligned with the slot 328. Accordingly, movement of the handle 306 from the first handle position toward the second handle position is blocked by contact between the first rod 324 and the blocking member 320. As previously discussed, with the handle 306 in the first handle position, the handle 306 drives the at least one biasing member 308 to urge the pin 302 toward the first pin position. The header frame may be raised or lowered relative to the soil surface (e.g., by controlling actuator(s) extending between the frame of the header and the chassis of the harvester). As the arm 216 reaches the locking orientation (e.g., the orientation that enables the pin 302 to move from the second portion 318 of the opening 314 to the first portion 316 of the opening 314), the locking mechanism 300 transitions to the locked state, in which the pin 302 is in the first portion 316 of the opening 314.

In the illustrated embodiment, a narrow slot 334 is formed in the blocking member 320. The width of the narrow slot 334 is less than the diameter of the first and second rods. The first and second rods are configured to engage the narrow slot 334, thereby blocking rotation of the handle 306 until the handle is moved away from the blocking member 320

(e.g., along the longitudinal axis 10). As a result of the rod/narrow slot interaction, the possibility of the handle rotating during operation of the agricultural header is substantially reduced or eliminated. However, in alternative embodiments, the narrow slot may be omitted (e.g., the slot 328 may be the only slot formed in the blocking member 320). While the rods are aligned with one another in the illustrated embodiment, in other embodiments, the rods may be offset from one another along the circumferential axis of the extension member of the handle. In such embodiments, multiple slots may be formed in the blocking member to facilitate passage of the circumferentially offset rods. Furthermore, while the illustrated handle includes rods to control translation of the handle relative to the blocking member (e.g., along the longitudinal axis), in other embodiments, the handle may include another suitable type of blocking feature, such as a rectangular extension or a protrusion. In such embodiments, the blocking member may have a suitable aperture to facilitate movement of the handle relative to the blocking member while the blocking features are aligned with the aperture.

Furthermore, while the illustrated opening 314 in the plate 310 has two portions, in other embodiments, at least one plate may include more portions (e.g., 3, 4, 5, or more). For example, the plate opening may include a third portion positioned rearward of the second portion and extending along the longitudinal axis. In such a configuration, the pin may be moved to the first portion or the third portion to block rotation of the arm about the pivot axis. In addition, while a single pin is movably coupled to the handle in the illustrated embodiment, in other embodiments, multiple pins may be movably coupled to the handle. In such embodiments, each pin may extend through opening(s) in respective plate(s). For example, the opening(s) in the plate(s) for one pin may have substantially the same shape/number of portions as the opening(s) in the plate(s) for another pin.

Figure 8:
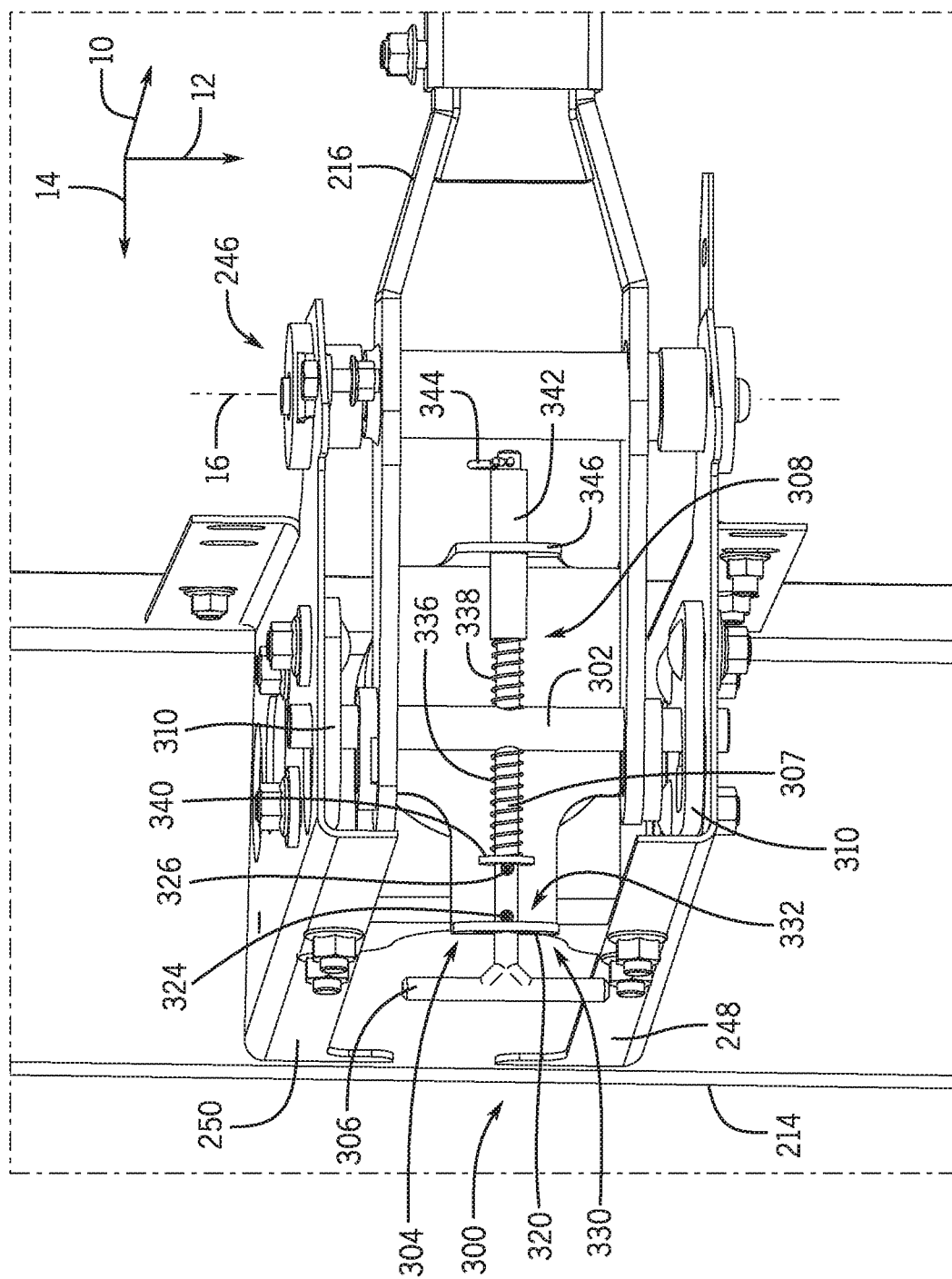
FIG. 8 is a bottom perspective view of the locking mechanism of FIG. 6.

FIG. 8 is a bottom perspective view of the locking mechanism 300 of FIG. 6. In the illustrated embodiment, the at least one biasing member 308 includes a first spring 336 positioned on a first side of the pin 302, and a second spring 338 positioned on a second side of the pin 302, opposite the first side. In the illustrated embodiment, the first spring 336 and the second spring 338 are coil springs disposed about the extension member 307 of the handle 306. In addition, the first spring 336 and the second spring 338 are compression springs (e.g., each spring is mounted such that the spring only applies a force in response to compression of the spring). The first spring 336 is disposed between the pin 302 and a washer 340. The washer 340 is disposed about the extension member 307 of the handle 306 and configured to move along the extension member 307 (e.g., along the longitudinal axis 10). However, movement of the washer 340 along the extension member 307 away from the pin 302 is blocked by the second rod 326. In addition, the second spring 338 is disposed between the pin 302 and a sleeve 342. The sleeve 342 is disposed about the extension member 307 of the handle 306. Movement of the sleeve 342 along the extension member 307 away from the pin 302 is blocked by a clip 344. As illustrated, the sleeve 342 extends through a support 346, which is coupled to the arm 216. The sleeve 342 is movable (e.g., along the longitudinal axis 10) through the support 346. Accordingly, the handle 306 is movably coupled to the arm 216 by the support 346 and the blocking member 320. While movement of the sleeve 342 relative to the handle 306 is blocked by the clip 344 in the illustrated embodiment, in other embodiments, movement of the sleeve away from the pin may be blocked by another suitable system, such as a nut, a welded connection between the sleeve and the handle, etc.

To transition the locking mechanism 300 from the illustrated locked state to the unlocked state, the handle 306 may be rotated (e.g. about the longitudinal axis 10) such that the first rod 324 and the second rod 326 are aligned with the slot in the blocking member 320. The handle 306 may then be moved from the illustrated first handle position to the second handle position (e.g. via reward translation along the longitudinal axis 10). With the handle 306 in the second handle position, the second rod 326 is positioned on the first side 330 of the blocking member 320. The handle 306 may then be rotated (e.g., about the longitudinal axis 10) such that the second rod 326 is not aligned with the slot in the blocking member 320. Accordingly, movement of the handle 306 from the second handle position toward the first handle position is blocked by contact between the second rod 326 and the blocking member 320. With the handle 306 in the second handle position and the pin 302 in the first pin position, the second spring 338 is compressed between the sleeve 342 and the pin 302 (e.g., while the first spring 336 is not compressed due to movement of the washer 340 away from the pin 302), thereby urging the pin 302 toward the second pin position. The header frame may be raised or lowered relative to the soil surface (e.g., by controlling actuator(s) extending between the frame of the header and the chassis of the harvester). As the arm 216 reaches the unlocking orientation (e.g., the orientation that enables the pin 302 to move from the first portion of the opening in the plate 310 to the second portion of the opening in the plate 310), the locking mechanism 300 transitions to the unlocked state, in which the pin 302 is in the second portion of the opening in the plate 310. In addition, while the locking mechanism 300 is in the unlocked state, the first spring 336 and the second spring 338 apply substantially equal forces to the pin 302, such that the pin 302 is not substantially urged toward either pin position.

To transition the locking mechanism 300 from the unlocked state to the locked state, the handle 306 may be rotated (e.g. about the longitudinal axis 10) such that the first rod 324 and the second rod 326 are aligned with the slot in the blocking member 320. The handle 306 may then be moved from the second handle position to the first handle position (e.g. via forward translation along the longitudinal axis 10). With the handle 306 in the first handle position, the first rod 324 is positioned on the second side 332 of the blocking member 320. The handle 306 may then be rotated (e.g., about the longitudinal axis 10) such that the first rod 324 is not aligned with the slot in the blocking member 320. Accordingly, movement of the handle 306 from the first handle position toward the second handle position is blocked by contact between the first rod 324 and the blocking member 320. With the handle 306 in the first handle position and the pin 302 in the second pin position, the first spring 336 is compressed between the washer 340 and the pin 302 (e.g., while the second spring 338 is not compressed due to movement of the sleeve 342 away from the pin 302), thereby urging the pin 302 toward the first pin position. The header frame may be raised or lowered relative to the soil surface (e.g., by controlling actuator(s) extending between the frame of the header and the chassis of the harvester). As the arm 216 reaches the locking orientation (e.g., the orientation that enables the pin 302 to move from the second portion of the opening in the plate 310 to the first portion of the opening in the plate 310), the locking mechanism 300 transitions to the locked state, in which the pin 302 is in the first portion of the opening in the plate 310. In addition, while the locking mechanism 300 is in the locked state, the first spring 336 and the second spring 338 apply substantially equal forces to the pin 302, such that the pin 302 is not substantially urged toward either pin position.

While the springs are compression springs in the illustrated embodiment, in other embodiments, at least one spring may be a compression/tension spring (e.g., mounted such that the spring applies a force in response to both compression and tension). Furthermore, while the illustrated springs are coil springs, in other embodiments, at least one spring may be another suitable type of spring, such as a leaf spring. In addition, while the locking mechanism includes two springs in the illustrated embodiment, in other embodiments, the locking mechanism may include more or fewer springs (e.g., 1, 2, 3, 4, 5, 6, or more). Furthermore, while the at least one biasing member includes spring(s) in the illustrated embodiment, in other embodiments, the at least one biasing member may include one or more other suitable type(s) of biasing element(s), such as resilient member(s), hydraulic cylinder(s), or pneumatic cylinder(s) (e.g., either alone or in combination with one or more springs).

Figure 9:
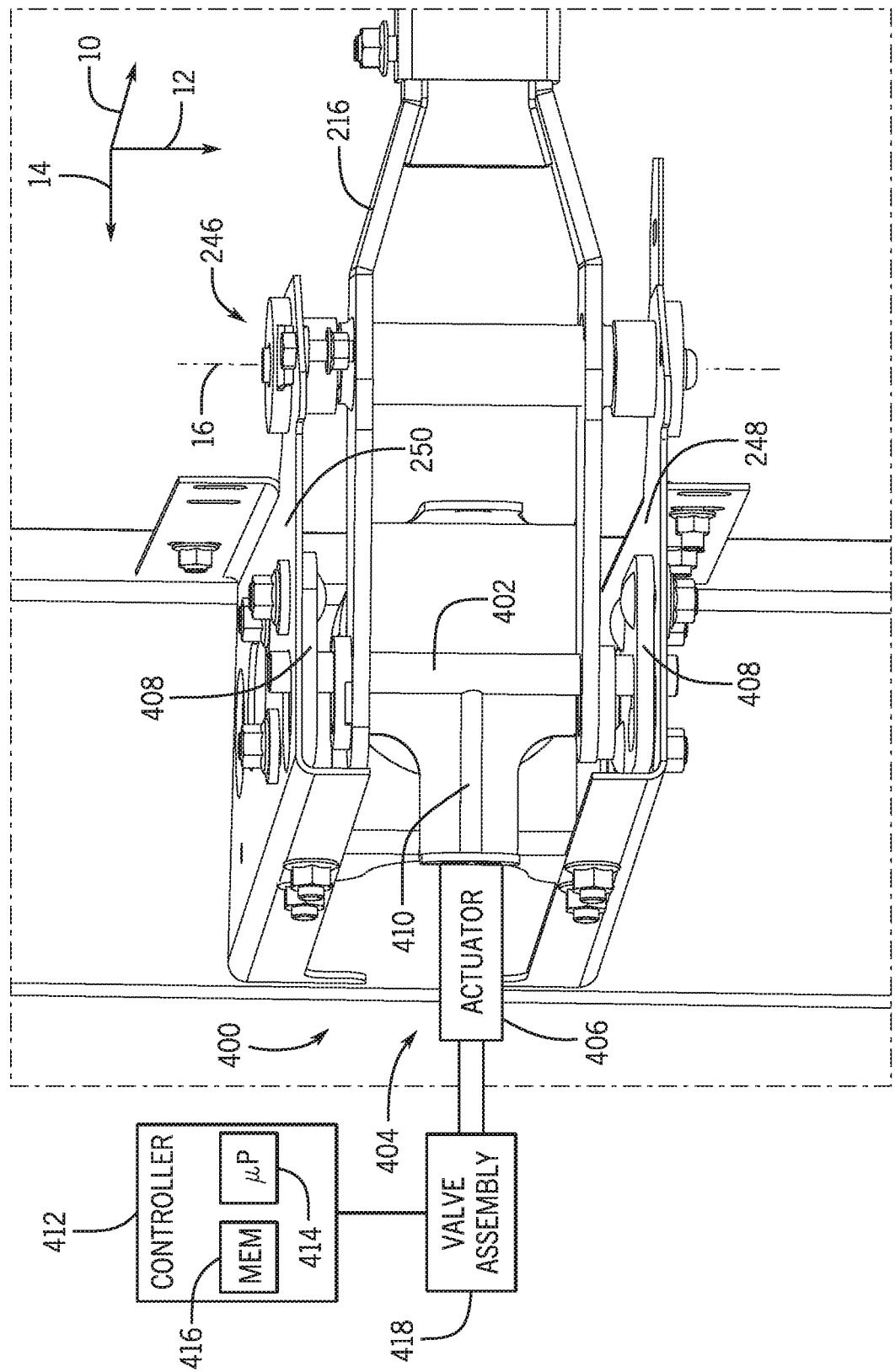
FIG. 9 is a bottom perspective view of another embodiment of a locking mechanism that may be used within the header of FIG. 2.

FIG. 9 is a bottom perspective view of another embodiment of a locking mechanism 400 that may be used within the header of FIG. 2. In the illustrated embodiment, the locking mechanism 400 includes a pin 402 movably coupled to the arm 216 of the agricultural header (e.g., via a slot in the arm). The pin 402 is movable between a first pin position and a second pin position relative to the arm 216. As previously discussed, the arm 216 is configured to rotate about the pivot axis 16 relative to the frame 214 of the agricultural header. In the illustrated embodiment, the locking mechanism 400 includes an actuator assembly 404 having an actuator 406. The actuator 406 is configured to selectively urge the pin 402 toward the first pin position and toward the second pin position. Similar to the embodiment described above with reference to FIGS. 5-8, the locking mechanism 400 includes mounts, such as the illustrated plates 408, each coupled to the frame 214 of the agricultural header. Each plate 408 has an opening and the pin 402 is disposed within the opening. The opening has a first portion configured to receive the pin while the pin is in the first pin position, and the opening has a second portion configured to receive the pin while the pin is in the second pin position. The first portion is configured to block movement of the pin 402 about the pivot axis 16 to block rotation of the arm 216, and the second portion is configured to enable movement of the pin 402 about the pivot axis 16 to enable rotation of the arm 216. While the illustrated locking mechanism 400 includes two plates 408, in other embodiments, the locking mechanism may include more or fewer plates. In addition, while each mount is plate-shaped in the illustrated embodiment, in other embodiments, at least one mount may have another suitable shape (e.g., a three-dimensional shape configured to match the contours of the frame, a rectangular prismatic shape, etc.).

In the illustrated embodiment, a rod 410 of the actuator 406 is coupled to the pin 402. In addition, the actuator 406 is configured to transition between a first state and a second state. The actuator 406 is configured to urge the pin 402 toward the first pin position while the actuator 406 is in the first state, and the actuator 406 is configured to urge the pin 402 toward the second pin position while the actuator 406 is in the second state. In certain embodiments, the actuator 406 is a pneumatic actuator, and the state of the actuator may be controlled by controlling air flow to the actuator. In other embodiments, the actuator may be a hydraulic actuator or any other suitable type of actuator configured to selectively urge the pin toward the first pin position and toward the second pin position.

In the illustrated embodiment, the actuator assembly 400 includes a controller 412 configured to selectively instruct the actuator 406 to urge the pin 402 toward the first pin position and toward the second pin position. In certain embodiments, the controller 412 is an electronic controller having electrical circuitry configured to output instructions to the actuator 406. In the illustrated embodiment, the controller 412 includes a processor, such as the illustrated microprocessor 414, and a memory device 416. The controller 412 may also include one or more storage devices and/or other suitable components. The processor 414 may be used to execute software, such as software for controlling the actuator 406, and so forth. Moreover, the processor 414 may include multiple microprocessors, one or more "general-purpose" microprocessors, one or more special-purpose microprocessors, and/or one or more application specific integrated circuits (ASICS), or some combination thereof. For example, the processor 414 may include one or more reduced instruction set (RISC) processors.

The memory device 416 may include a volatile memory, such as random access memory (RAM), and/or a nonvolatile memory, such as read-only memory (ROM). The memory device 416 may store a variety of information and may be used for various purposes. For example, the memory device 416 may store processor-executable instructions (e.g., firmware or software) for the processor 414 to execute, such as instructions for controlling the actuator 406, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the actuator 406, etc.), and any other suitable data.

In the illustrated embodiment, the controller 412 is communicatively coupled to a valve assembly 418 (e.g., a pneumatic valve assembly). In addition, the valve assembly 418 is fluidly coupled to the actuator 406 and configured to control fluid flow to/from the actuator 406. For example, to block movement of the arm 216, the controller 412 may instruct the valve assembly 418 to control fluid flow to/from the actuator 406 such that the actuator 406 urges the pin 402 toward the first pin position. Furthermore, to enable movement of the arm, the controller 412 may instruct the valve assembly 418 to control fluid flow to/from the actuator 406 such that the actuator 406 urges the pin 402 toward the second pin position.

By way of example, to transition the cutter bar assembly to the substantially rigid configuration, the controller 412 (e.g., in response to operator input) may output a signal to the valve assembly 418 indicative of instructions to cause the actuator 406 to urge the pin 402 toward the first pin position. The header frame may then be raised or lowered relative to the soil surface. For example, the controller 412 may control actuator(s) extending between the frame of the header and the chassis of the harvester. As the arm 216 reaches the locking orientation (e.g., the orientation that enables the pin 402 to move from the second portion of the opening in each plate 408 to the first portion of the opening in each plate 408), the locking mechanism 400 transitions to the locked state, in which the pin 402 is in the first portion of the opening in each plate 408, thereby blocking rotation of the arm 216. The process described above may be repeated for each arm coupled to the cutter bar assembly (e.g., concurrently or in sequence), thereby transitioning the cutter bar assembly to the substantially rigid configuration.

To transition the cutter bar assembly to the flexible configuration, the controller 412 (e.g., in response to operator input) may output a signal to the valve assembly 418 indicative of instructions to cause the actuator 406 to urge the pin 402 toward the second pin position. The header frame may then be raised or lowered relative to the soil surface. For example, the controller 412 may control actuator(s) extending between the frame of the header and the chassis of the harvester. As the arm 216 reaches the unlocking orientation (e.g., the orientation that enables the pin 402 to move from the first portion of the opening in each plate 408 to the second portion of the opening in each plate 408), the locking mechanism 400 transitions to the unlocked state, in which the pin 402 is in the second portion of the opening in each plate 408, thereby enabling rotation of the arm 216. The process described above may be repeated for each arm coupled to the cutter bar assembly (e.g., concurrently or in sequence), thereby transitioning the cutter bar assembly to the flexible configuration.

In certain embodiments, the actuator may be coupled to multiple pins (e.g., via a linkage assembly), in which each pin is movably coupled to a respective arm. Accordingly, movement of multiple arms may be controlled by a single actuator. Furthermore, in certain embodiments, multiple actuators may be coupled to multiple respective pins, in which each pin is movably coupled to a respective arm. In such embodiments, the valve assembly may be fluidly coupled to each actuator, thereby enabling the controller to control the actuators. In other embodiments, the locking mechanism may include a separate valve assembly for each actuator. In such embodiments, the controller may be communicatively coupled to each valve assembly to facilitate control of the actuators. Furthermore, in certain embodiments, at least one actuator may be an electrically controlled actuator, such as a solenoid or an electric motor. In such embodiments, the at least one actuator may be communicatively coupled to the control (e.g., the valve assembly may be omitted).

In certain embodiments, the agricultural header may include a combination of the locking mechanism 300 described above with reference to FIGS. 3-8 and the locking mechanism 400 described above with referenced to FIG. 9. For example, certain arm(s) may be controlled by the locking mechanism 300, and other arm(s) may be controlled by the locking mechanism 400. Furthermore, while the locking mechanisms are configured to control movement of arms of the header in the illustrated embodiments, the locking mechanisms described above may also be used (e.g., individually or in combination) to control movement of end portion(s) of the header and/or an infeed deck of the header.

In certain embodiments, the pin is movably coupled to a first element of the header, such that the pin is movable between the first pin position and the second pin position relative to the first element. In addition, the mount (e.g., plate) is coupled to a second element of the agricultural header. In the embodiments disclosed herein, the first element is/includes one arm and the second element is/includes the frame. However, in other embodiments, the first element may be/include the frame, and the second element may be/include one arm. In such embodiments, the pin is movably coupled to the frame, such that the pin is movable between the first pin position and the second pin position relative to the frame. In addition, the mount is coupled to the arm, and the pin is disposed within the opening in the mount. Furthermore, the first portion of the opening in the mount is configured to block movement of the mount relative to the pin about the pivot axis to block rotation of the arm, and the second portion of the opening in the mount is configured to enable movement of the mount about the pivot axis to enable rotation of the arm. In such embodiments, certain features disclosed herein with regard to the frame (e.g., the openings 252, etc.) may be formed within the arm, and certain features disclosed herein with regard to the arm (e.g., the slots 234, etc.) may be formed within the frame.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A locking mechanism, comprising:
a pin configured to be movably coupled to a first element of an agricultural header, such that the pin is movable between a first pin position and a second pin position relative to the first element, wherein the first element comprises one of an arm and a frame of the agricultural header;
a biasing assembly configured to selectively urge the pin toward the first pin position and toward the second pin position; and
a mount configured to non-movably and non-rotatably couple to a second element of the agricultural header, wherein the second element comprises the other of the arm and the frame;
wherein the arm is configured to support a cutter bar assembly of the agricultural header, the arm is configured to rotate about a pivot axis relative to the frame, the mount has an opening, the pin is disposed within the opening, the opening has a first portion and a second portion, the first portion is configured to receive the pin while the pin is in the first pin position, the second portion is configured to receive the pin while the pin is in the second pin position, the first portion is configured to block relative movement between the pin and the mount about the pivot axis to block rotation of the arm, and the second portion is configured to enable relative movement between the pin and the mount about the pivot axis to enable rotation of the arm.

2. The locking mechanism of claim 1, wherein the biasing assembly comprises at least one spring.

3. The locking mechanism of claim 2, wherein the at least one spring comprises a first spring positioned on a first side of the pin and a second spring positioned on a second side of the pin, opposite the first side.

4. The locking mechanism of claim 1, wherein the biasing assembly comprises a handle and at least one biasing member, the handle is movable between a first handle position and a second handle position, the handle is configured to drive the at least one biasing member to urge the pin toward the first pin position while the handle is in the first handle position, and the handle is configured to drive the at least one biasing member to urge the pin toward the second pin position while the handle is in the second handle position.

5. The locking mechanism of claim 4, wherein the at least one biasing member comprises a first spring on a first side of the pin and a second spring on a second side of the pin, opposite the first side.

6. The locking mechanism of claim 4, further comprising a blocking member having an opening, wherein the handle extends through the opening of the blocking member, the handle has a first blocking feature configured to engage the blocking member to block movement of the handle from the first handle position to the second handle position while the handle is in the first handle position, and the handle has a second blocking feature configured to engage the blocking member to block movement of the handle from the second handle position to the first handle position while the handle is in the second handle position.

7. The locking mechanism of claim 6, wherein the first blocking feature comprises a first rod, the second blocking feature comprises a second rod, and the blocking member has a slot configured to facilitate passage of the first rod through the blocking member while the first rod is aligned with the slot and to facilitate passage of the second rod through the blocking member while the second rod is aligned with the slot.

8. An agricultural header, comprising:
a frame;
an arm pivotally coupled to the frame, wherein the arm is configured to rotate about a pivot axis relative to the frame, and the arm is configured to support a cutter bar assembly; and
a locking mechanism configured to selectively block rotation of the arm about the pivot axis, wherein the locking mechanism comprises:
a pin movably coupled to a first element of the agricultural header, wherein the pin is configured to move between a first pin position and a second pin position relative to the first element, wherein the first element comprises one of the arm and the frame;
a biasing assembly configured to selectively urge the pin toward the first pin position and toward the second pin position; and
a mount non-movably and non-rotatably coupled to a second element of the agricultural header, wherein the second element comprises the other of the arm and the frame;
wherein the mount has an opening, the pin is disposed within the opening, the opening has a first portion and a second portion, the first portion is configured to receive the pin while the pin is in the first pin position, the second portion is configured to receive the pin while the pin is in the second pin position, the first portion is configured to block relative movement between the pin and the mount about the pivot axis to block rotation of the arm, and the second portion is configured to enable relative movement between the pin and the mount about the pivot axis to enable rotation of the arm.

9. The agricultural header of claim 8, wherein the biasing assembly comprises at least one spring.

10. The agricultural header of claim 9, wherein the at least one spring comprises a first spring positioned on a first side of the pin and a second spring positioned on a second side of the pin, opposite the first side.

11. The agricultural header of claim 8, wherein the biasing assembly comprises a handle and at least one biasing member, the handle is movable between a first handle position and a second handle position, the handle is configured to drive the at least one biasing member to urge the pin toward the first pin position while the handle is in the first handle position, and the handle is configured to drive the at least one biasing member to urge the pin toward the second pin position while the handle is in the second handle position.

12. The agricultural header of claim 11, wherein the at least one biasing member comprises a first spring on a first side of the pin and a second spring on a second side of the pin, opposite the first side.

13. The agricultural header of claim 11, wherein the locking mechanism further comprises a blocking member having an opening, the handle extends through the opening of the blocking member, the handle has a first blocking feature configured to engage the blocking member to block movement of the handle from the first handle position to the second handle position while the handle is in the first handle position, and the handle has a second blocking feature configured to engage the blocking member to block movement of the handle from the second handle position to the first handle position while the handle is in the second handle position.

14. The agricultural header of claim 13, wherein the first blocking feature comprises a first rod, the second blocking feature comprises a second rod, and the blocking member has a slot configured to facilitate passage of the first rod through the blocking member while the first rod is aligned with the slot and to facilitate passage of the second rod through the blocking member while the second rod is aligned with the slot.

15. A locking mechanism, comprising:
a pin configured to be movably coupled to a first element of an agricultural header, such that the pin is movable between a first pin position and a second pin position relative to the first element, wherein the first element comprises one of an arm and a frame of the agricultural header;
an actuator assembly comprising an actuator configured to selectively urge the pin toward the first pin position and toward the second pin position; and
a mount configured to non-movably and non-rotatably couple to a second element of the agricultural header, wherein the second element comprises the other of the arm and the frame;
wherein the arm is configured to support a cutter bar assembly of the agricultural header, the arm is configured to rotate about a pivot axis relative to the frame, the mount has an opening, the pin is disposed within the opening, the opening has a first portion and a second portion, the first portion is configured to receive the pin while the pin is in the first pin position, the second portion is configured to receive the pin while the pin is in the second pin position, the first portion is configured to block relative movement between the pin and the mount about the pivot axis to block rotation of the arm, and the second portion is configured to enable relative movement between the pin and the mount about the pivot axis to enable rotation of the arm.

16. The locking mechanism of claim 15, wherein the actuator is configured to transition between a first state and a second state, the actuator is configured to urge the pin toward the first pin position while the actuator is in the first state, and the actuator is configured to urge the pin toward the second pin position while the actuator is in the second state.

17. The locking mechanism of claim 15, wherein the actuator comprises a pneumatic actuator.

18. The locking mechanism of claim 15, wherein the actuator assembly comprises a controller configured to selectively instruct the actuator to urge the pin toward the first pin position and toward the second pin position.

19. The locking mechanism of claim 18, further comprising a valve assembly communicatively coupled to the controller and fluidly coupled to the actuator, wherein the valve assembly is configured to control fluid flow to and from the actuator.

20. The locking mechanism of claim 19, wherein the actuator comprises a pneumatic actuator and the valve assembly comprises a pneumatic valve assembly.

* * * * *